US012250097B2

(12) United States Patent
Bleidorn (10) Patent No.: US 12,250,097 B2
(45) Date of Patent: Mar. 11, 2025

(54) FLEXIBLE NODAL LAYER THREE OVERLAY OF LAYER TWO TRAFFIC

(71) Applicant: Charter Communications Operating, LLC, St. Louis, MO (US)

(72) Inventor: Timothy Bleidorn, Colorado Springs, CO (US)

(73) Assignee: Charter Communications Operating, LLC, St. Louis, MO (US)

(*) Notice: Subject to any disclaimer, the term of this patent is extended or adjusted under 35 U.S.C. 154(b) by 197 days.

(21) Appl. No.: 17/731,440

(22) Filed: Apr. 28, 2022

(65) Prior Publication Data

US 2023/0353420 A1    Nov. 2, 2023

(51) Int. Cl.
| | | |
|---|---|---|
| *H04L 12/46* | (2006.01) | |
| *H04L 43/062* | (2022.01) | |
| *H04L 45/64* | (2022.01) | |
| *H04W 40/24* | (2009.01) | |

(52) U.S. Cl.
CPC ........ *H04L 12/4633* (2013.01); *H04L 43/062* (2013.01); *H04L 45/64* (2013.01); *H04W 40/24* (2013.01)

(58) Field of Classification Search
CPC ....... H04L 45/64; H04L 45/66; H04L 45/586; H04L 45/74; H04L 45/745; H04L 45/50; H04L 12/4604; H04L 12/4633; H04L 12/4641; H04L 2212/00; H04L 43/062; H04L 43/065; H04L 43/067; H04L 43/12; H04W 40/24; H04W 80/02; H04W 80/04; H04W 80/045; H04W 80/06; H04W 80/08; H04W 80/085
See application file for complete search history.

(56) References Cited

U.S. PATENT DOCUMENTS

| | | | | |
|---|---|---|---|---|
| 9,979,557 | B2* | 5/2018 | Roy | ........................ H04L 69/22 |
| 2016/0036773 | A1* | 2/2016 | Luo | ..................... H04L 12/4633 |
| | | | | 370/392 |
| 2021/0126858 | A1* | 4/2021 | Bisti | ..................... H04W 40/20 |
| 2022/0337603 | A1* | 10/2022 | Shah | ..................... H04L 63/102 |

* cited by examiner

*Primary Examiner* — Peter Chen
(74) *Attorney, Agent, or Firm* — Young Basile Hanlon & MacFarlane, P.C.

(57) ABSTRACT

Methods and systems for flexible nodal layer 3 overlay of layer 2 traffic is described. A network includes an access device for receiving layer 2 traffic from user devices, a packet inspection device for inspecting the layer 2 traffic, and a layer 3 tunnel instantiation device for encapsulating the layer 2 traffic into layer 3 traffic. The layer 3 tunnel instantiation device provides a first tunnel endpoint for a layer 3 tunnel, which is connected to a second tunnel endpoint instantiated at a network gateway. The layer 3 tunnel instantiation device establishes a moveable demarcation between a layer 2 domain and a layer 3 domain with respect to the packet inspection device, where the access device and the packet inspection device operate in the layer 2 domain. The layer 3 traffic is transmitted over the layer 3 tunnel.

16 Claims, 6 Drawing Sheets

FLEXIBLE NODAL LAYER THREE OVERLAY OF LAYER TWO TRAFFIC

TECHNICAL FIELD

This disclosure relates to network communications. More specifically, providing a layer three (3) overlay which is configurable at different layer two (2) traffic points or nodes.

BACKGROUND

The Open Systems Interconnection (OSI) model is a seven layer architecture for describing communication functionality in network communications. Layer 2 of the OSI model is the data link layer and is generally associated with the Ethernet protocol and the creation and transmission of Ethernet frames. Layer 3 of the OSI model is the network layer and is generally associated with the Internet Protocol and the establishment and maintenance of routes for transmitting data.

Many commercial Wi-Fi implementations utilize layer 3 point-to-point tunneling strategies to carry layer 2 traffic across a trusted or untrusted layer 3 network. Layer 3 point-to-point tunneling encapsulates the layer 2 traffic or packets for direct point-to-point transmission across a network for the purpose of simplifying connections between tunnel endpoints in separate networks. For example, Generic Routing Encapsulation (GRE) is an example of a layer 3 point-to-point tunneling protocol. The nodal positioning of the tunnel endpoints or termination points are generally set at a centralized network gateway (NG) and either a customer premise equipment (CPE) or a controller of the CPE at a network edge.

Implementations of commercial Wi-Fi architectures continue to grow in scope and complexity. They now include more and more site-specific network requirements such as custom traffic filtering and re-direct features. These site-specific network requirements are performed in the layer 2 traffic space. Once the layer 2 traffic is encapsulated in the layer 3 tunneling space, the site-specific network requirements are unable to be executed. Consequently, provision for flexible and configurable placement of layer 3 tunnel endpoints within a site is needed.

SUMMARY

Disclosed herein are methods and systems for flexible nodal layer 3 overlay of layer 2 traffic. A method includes provisioning a layer 2 access device for wireless access to a site network by user devices. A layer 2 inspection device is configured to process, in accordance with a policy imposed by the site network, layer 2 packets received from the layer 2 access device. A layer 3 device is provisioned for layer 2 packet encapsulation of the layer 2 packets and transmission of encapsulated layer 2 packets over a layer 3 tunnel. The layer 3 device instantiates a first layer 3 tunnel endpoint as a flexible layer 2-layer 3 demarcation line with respect to the layer 2 inspection device. A second layer 3 tunnel endpoint is provisioned at a network gateway.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

DETAILED DESCRIPTION

Reference will now be made in greater detail to embodiments of the invention, examples of which are illustrated in the accompanying drawings. Wherever possible, the same reference numerals will be used throughout the drawings and the description to refer to the same or like parts.

As used herein, the terminology "computer" or "computing device" includes any unit, or combination of units, capable of performing any method, or any portion or portions thereof, disclosed herein. For example, the "computer" or "computing device" may include at least one or more processor(s).

As used herein, the terminology "processor" indicates one or more processors, such as one or more special purpose processors, one or more digital signal processors, one or more microprocessors, one or more controllers, one or more microcontrollers, one or more application processors, one or more central processing units (CPU) s, one or more graphics processing units (GPU) s, one or more digital signal processors (DSP) s, one or more application specific integrated circuits (ASIC) s, one or more application specific standard products, one or more field programmable gate arrays, any other type or combination of integrated circuits, one or more state machines, or any combination thereof.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks or activities. For example, applications may perform one or more functions including, but not limited to, telephony, web browsers, e-commerce transactions, media players, travel scheduling and management, smart home management, entertainment, and the like. The unit of executable software generally runs in a predetermined environment and/or a processor.

As used herein, the terminology "determine" and "identify." or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is unless specified otherwise, or clear from context, "X includes A or B" is intended to indicate any of the natural inclusive permutations. That is if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps are well known in the art, and because they do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Figure 1:
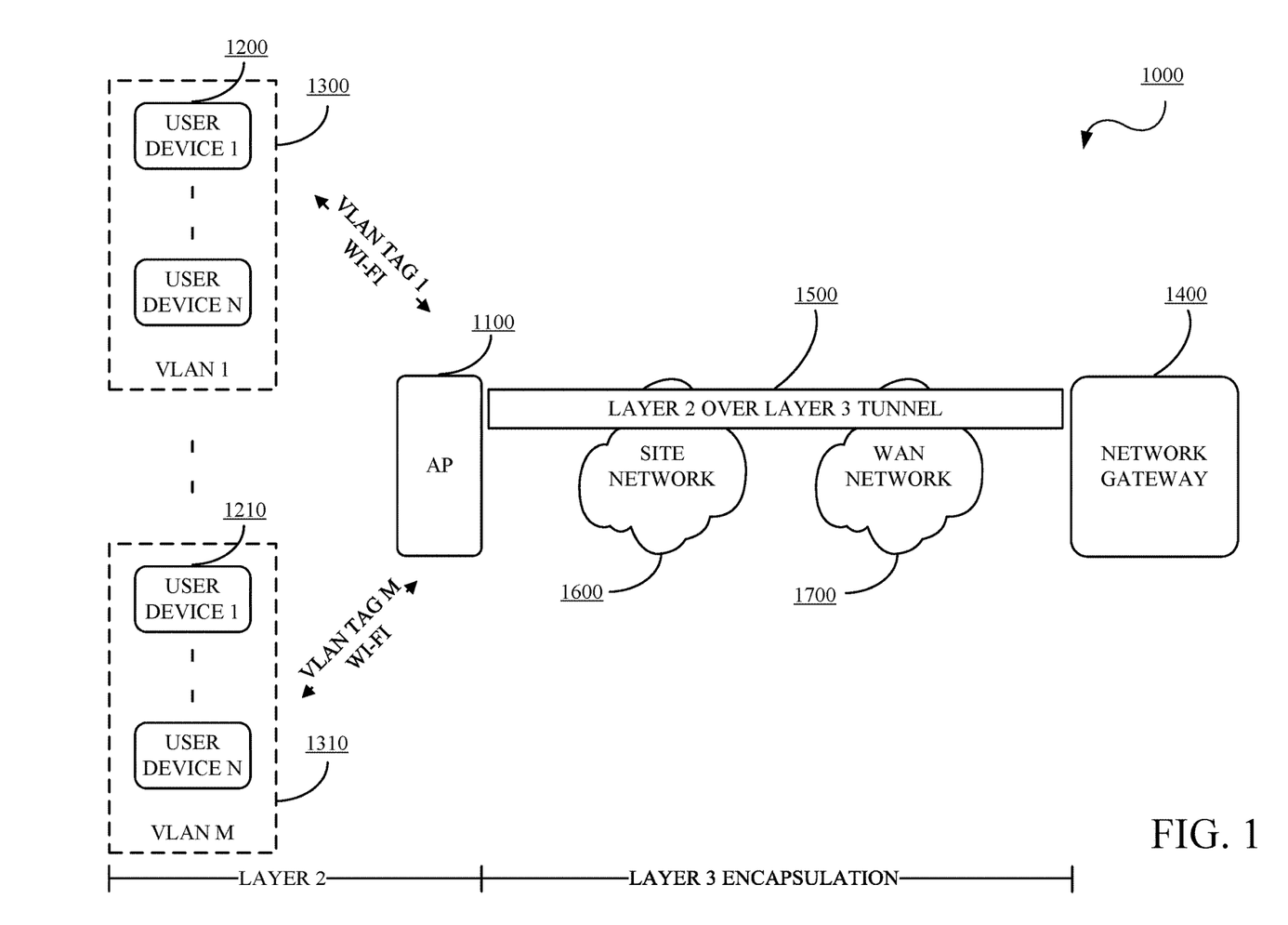
FIG. 1 is a diagram of an example of a network architecture.

FIG. 1 is a diagram of an example network architecture 1000. The architecture 1000 can include an access point (AP) 1100 which can provide wireless coverage, such as Wi-Fi coverage, to user devices 1, 2 . . . , N 1200 and 1210. In some implementations, the architecture 1000, the AP 1100 and the user devices 1, 2, . . . , N 1200 and 1210 can include virtual local area network (VLAN) capabilities, including hardware and software, to tag and compartmentalize wireless traffic, such as Wi-Fi traffic, using one or VLAN channels 1, 2, . . . , M 1300 and 1310 with associated VLAN tags 1, 2, . . . , M. The wireless or Wi-Fi traffic can be an example of layer 2 traffic. The AP 1100 is in communication with a network gateway (NG) 1400 via a layer 3 tunnel 1500 which traverses a site network 1600 and a wide area network (WAN) 1700. Communications between the described elements can include wired communications, wireless communications, or a combination thereof. The quantity of described devices or elements is illustrative. The architecture 1000 is illustrative and may include additional, fewer, or different devices, entities and the like which may be similarly or differently architected without departing from the scope of the specification and claims herein. Moreover, the illustrated devices may perform other functions without departing from the scope of the specification and claims herein.

The user devices 1, 2, . . . , N 1200 and 1210 can be, but are not limited to, Internet of Thing (IoT) devices, end user devices, cellular telephones, Internet Protocol (IP) devices, mobile computers, laptops, handheld computers, personal media devices, smartphones, notebooks, notepads, and the like which are capable, configured, and/or provisioned for operation with the AP 1100.

The AP 1100 can be, but is not limited to, a base station, an access point, an access node, or like device which enables radio communications access between, for example, the user devices 1, 2, . . . , N 1200 and 1210 to other devices, such as, the NG 1400. For example, the AP 1100 can serve as the Wi-Fi service det identifier (SSID) base station and can perform encapsulation of user devices 1, 2 . . . , N 1200 and 1210 frames for tunneled transport to the NG 1400. The AP 1100 can be or function as one tunnel endpoint for the layer 3 tunnel 1500. The AP 1100 encapsulates the layer 2 traffic to generate layer 3 traffic or layer 3 encapsulated traffic, which is sent over the layer 3 tunnel 1500 to the NG 1400. The layer 3 tunnel 1500 acts as a point-to-point overlay to allow for layer 2 (Ethernet) communication over multiple disparate networks.

The NG 1400 can perform as the other tunnel endpoint and can facilitate layer 3 gateway services, such as access to the Internet, to the user devices 1, 2 . . . , N 1200 and 1210. The NG 1400, for example, can be at a service provider headend.

The site network 1600 can consist of local network devices and connections owned and managed by a specific site. The site network 1600 may include network functions that inspect, filter, and/or otherwise apply site-specific policy to user device traffic, such as the user devices 1, 2 . . . , N 1200 and 1210.

The WAN network 1700 can consist of any arbitrary Internet backhaul network or Internet service provider (ISP) network providing a commercial Wi-Fi solution. As such the individual network hops (e.g., routers and/or switches)

between the AP 1100 and the NG 1400 are obfuscated from the user device and the end station to which a specific flow may be destined.

In general, an encapsulation point for the layer 3 tunnel 1500 is instantiated at or on the AP 1100. Therefore, the encapsulation point is static with respect to the network architecture 1000. This means or results in the layer 2 domain being limited to the space between the user devices 1, 2 . . . , N 1200 and 1210 and the AP 1100 since once traffic traverses the encapsulation point of the AP 1100, the traffic is encapsulated in a layer 3 protocol. Further, the layer 3 encapsulated domain extends from the encapsulation point of the AP 1100 to the NG 1400. This encapsulation point instantiation, therefore, has the potential to break site specific functions that rely on the traffic passing a specific point in the site network 1600 before being encapsulated.

For example, many site-specific filtering and policy solutions and/or functions operate at or in the layer 2 domain. The placement of the layer 3 tunneling function within a network topology is therefore critical, and often dictates future services capabilities of the site. Tunneling (encapsulation of the user device traffic by the AP 1100) may prevent these site functions from performing their task due to a layer of obfuscation applied by the encapsulation function of the AP 1100. To the extent the site network 1600 employs site-specific network requirements, these site-specific network requirements are bypassed at the instantiation point, i.e., at the AP 1100, of the layer 3 tunnel 1500. That is, the site-specific network requirements are unexecuted. A need therefore arises for flexibly deployable and configurable layer 3 tunnel instantiation devices and methods.

Disclosed herein are methods and systems for employing a layer 3 tunnel instantiation device, configurable endpoint constructor, or Wi-Fi offload concentrator (WOC) (collectively "layer 3 tunnel instantiation device") which can be deployed based on a site's requirements and/or configuration. In some implementations, the layer 3 tunnel instantiation device can provide a means to selectively place offload-tunneling functions almost anywhere within the network topology or site to consolidate traffic to a centralized network gateway. In some implementations, the layer 3 tunnel instantiation device can support and/or use industry-standard and/or proprietary encapsulation methods for layer 2 user device or client traffic. The layer 3 tunnel instantiation device can selectively expand or contract the native layer 2 reach within a site infrastructure or network topology based on site specific requirements. Moreover, decoupling of the encapsulation or tunneling functionality from an access point or other like device permits increased offload opportunities such as, but not limited to, VLAN purging.

In some implementations, use of the layer 3 tunnel instantiation device can extend the layer 2 domain beyond site specific traffic policy functionality. Consequently, site specific traffic policy functionality can be applied to user device traffic and still get the benefit of layer 3 tunneling to the network gateway. For example, user device traffic can be inspected with respect to site policies regarding betting, pornography, security, malware, proprietary information, client information, or other policies. In this instance, the layer 3 tunnel instantiation device is instantiated close to the site or network edge.

In some implementations, a deep packet inspection (DPI) functionality or device is employed or deployed at a site or within a site network. The DPI functionality represents a nodal requirement present in the site network that user device traffic pass through the DPI device in the layer 2 domain. The DPI device can be any site-specific function that cannot be perturbed by the introduction of a Wi-Fi backhaul. That is, the DPI device cannot inspect traffic that has been encapsulated. The layer 3 tunnel instantiation device enables extension of the layer 2 domain beyond the instantiation of the Wi-Fi backhaul or the AP without perturbation of the DPI functionality.

In some implementations, the layer 3 tunnel instantiation device is a bidirectional encapsulation/de-encapsulation device. The layer 3 tunnel instantiation device can handle and encapsulate/de-encapsulate multiple user traffic data, such as multiple VLANs. In some implementations, the layer 3 tunnel instantiation device can include a tracking and reporting function.

Figure 2:
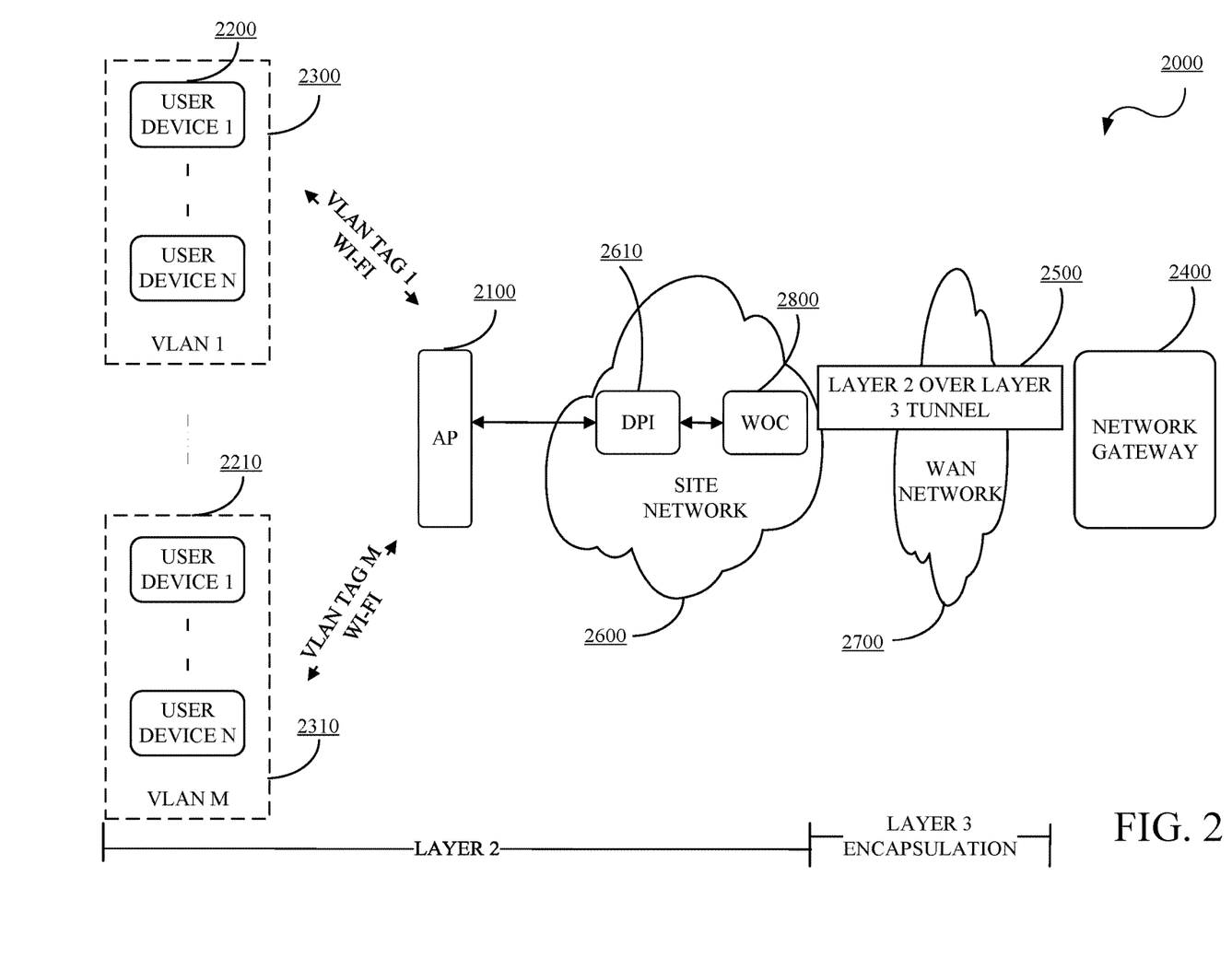
FIG. 2 is a diagram of an example of a network architecture with a layer 3 tunnel instantiation device in accordance with embodiments of this disclosure.

FIG. 2 is a diagram of an example network architecture 2000 in accordance with some implementations. The architecture 2000 can include a AP 1100 which can provide wireless coverage, such as Wi-Fi coverage, to user devices 1, 2 . . . , N 2200 and 2210. In some implementations, the architecture 2000, the AP 2100 and the user devices 1, 2 . . . , N 2200 and 2210 can include VLAN capabilities, including hardware and software, to tag and compartmentalize wireless traffic, such as Wi-Fi traffic, using one or VLAN channels 1, 2, . . . , M 2300 and 2310 with associated VLAN tags 1, 2, . . . , M. The wireless or Wi-Fi traffic can be an example of layer 2 traffic. The AP 2100 is in communication with a network gateway (NG) 2400 via a layer 3 tunnel instantiation device 2800 (represented as a WOC in FIG. 2) and a layer 3 tunnel 2500 which traverses a site network 2600 and a WAN 2700. In some implementations, the site network 2600 can include a DPI 2610. Communications between the described devices or elements can include wired communications, wireless communications, or a combination thereof. The architecture 2000 is illustrative and may include additional, fewer, or different devices, entities and the like which may be similarly or differently architected without departing from the scope of the specification and claims herein. The quantity of described devices or elements is illustrative. Moreover, the illustrated devices may perform other functions without departing from the scope of the specification and claims herein.

The user devices 1, 2, . . . , N 2200 and 2210 can be, but are not limited to, Internet of Thing (IoT) devices, end user devices, cellular telephones, Internet Protocol (IP) devices, mobile computers, laptops, handheld computers, personal media devices, smartphones, notebooks, notepads, and the like which are capable, configured, and/or provisioned for operation with the AP 2100.

The AP 2100 can be, but is not limited to, a base station, an access point, an access node, or like device which enables radio communications access between, for example, the user devices 1, 2, . . . , N 2200 and 2210 to other devices, such as, the WOC 2800. The AP 2100 operates at or in the layer 2 domain. For example, the AP 2100 can serve as the Wi-Fi service det identifier (SSID) base station and forward user device traffic data through the site network 2600 toward the layer 3 tunnel instantiation device 2800. In some implementations, some VLAN channels can be offloaded or purged to networks internal to the site network 2600 instead of being forwarded to the layer 3 tunnel instantiation device 2800. This can occur at the AP 2100, the DPI 2610, or other points prior to the layer 3 tunnel instantiation device 2800.

The layer 3 tunnel instantiation device 2800 can be or function as one tunnel endpoint for the layer 3 tunnel 2500. The layer 3 tunnel instantiation device 2800 can perform encapsulation of frames from user devices 1, 2 . . . , N 2200 and 2210 for tunneled transport to the NG 2400. The layer 3 tunnel instantiation device 2800 encapsulates the layer 2 traffic to generate layer 3 traffic or layer 3 encapsulated traffic, which is sent over the layer 3 tunnel 2500 to the NG 2400. The layer 3 tunnel 2500 acts as a point-to-point overlay to allow for layer 2 (Ethernet) communication over multiple disparate networks. In some implementations, the layer 3 tunnel instantiation device 2800 can handle multiple user device traffic data such as multiple VLAN channels with associated VLAN tags. Each VLAN channel can be handled and encapsulated in accordance with its policies and requirements.

The NG 2400 can perform as the other tunnel endpoint and can facilitate layer 3 gateway services, such as access to the Internet, to the user devices 1, 2 . . . , N 2200 and 2210. The NG 2400, for example, can be at a service provider headend.

The site network 2600 can consist of local network devices and connections owned and managed by a specific site. The site network 2600 may include network functions that inspect, filter, and/or otherwise apply site-specific policy to user device traffic, such as the user devices 1, 2, . . . , N 2200 and 2210. These network functions are represented as the DPI 2610 in FIG. 2. The DPI 2610 is a site network 2600 requirement for assessing traffic to and from the user devices 1, 2 . . . , N 2200 and 2210. The DPI 2610 operates on layer 2 traffic. Traffic forwarded by the AP 2100 is processed by the DPI 2610 prior to processing by the layer 3 tunnel instantiation device 2800.

The WAN network 2700 can consist of any arbitrary Internet backhaul network or ISP network providing a commercial Wi-Fi solution. As such the individual network hops (e.g., routers and/or switches) between the layer 3 tunnel instantiation device 2800 and the NG 2400 are obfuscated from the user device and the end station to which a specific flow may be destined.

The AP 2100 and the layer 3 tunnel instantiation device 2800 are logically and/or physically decoupled with respect to an encapsulation function. Operationally, this permits the layer 3 tunnel instantiation device 2800 to be placed in accordance with the requirements and policies of the site network 2600. The layer 2 domain can be extended beyond the DPI 2610 to facilitate site network 2600 requirements that all user device traffic be inspected. The instantiation of the layer 3 tunnel 2500 endpoint is now terminated closer to an edge of the site network 2600.

Figure 3:
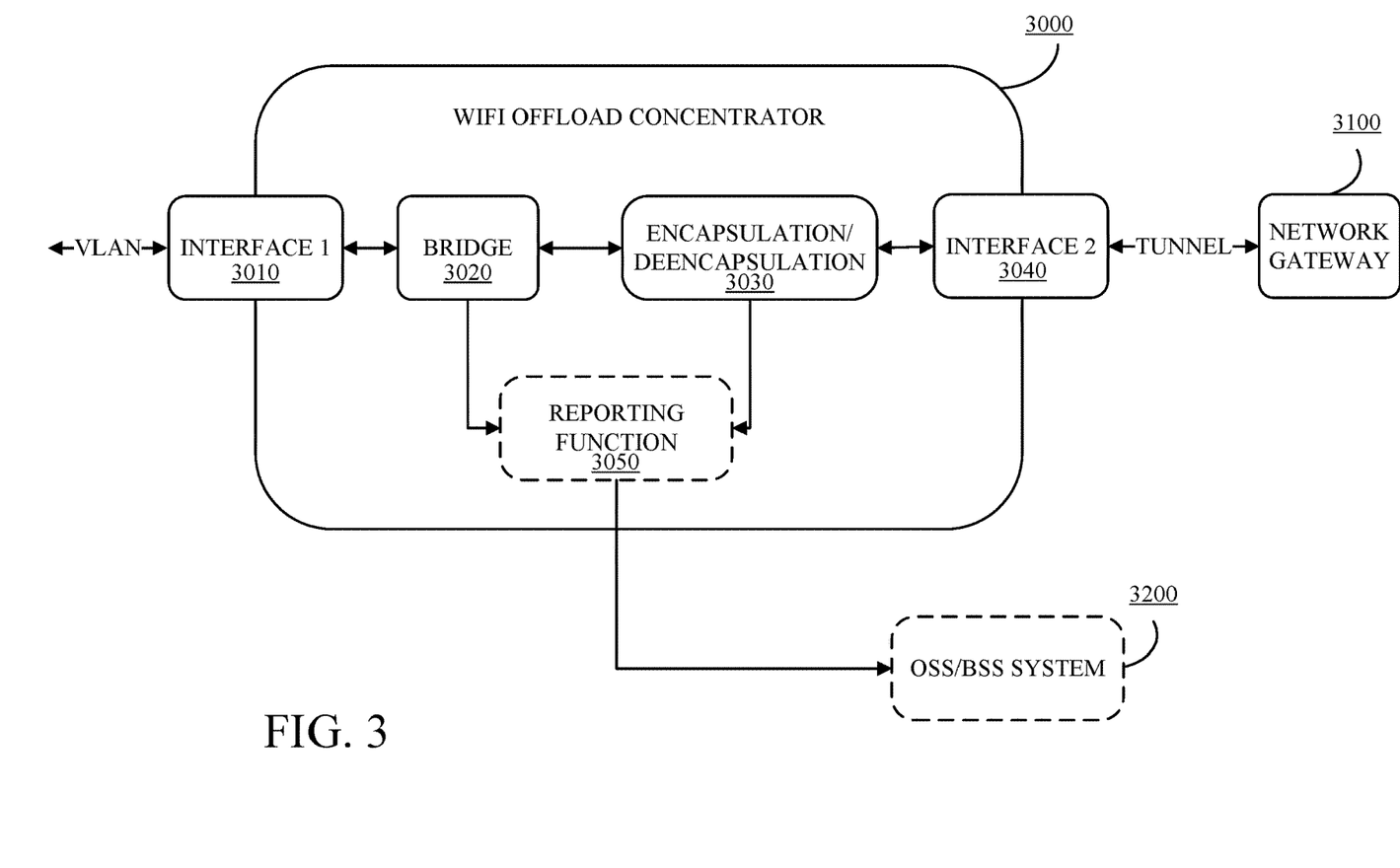
FIG. 3 is a block diagram of an example of a layer 3 tunnel instantiation device in accordance with embodiments of this disclosure.

FIG. 3 is a block diagram of an example of a layer 3 tunnel instantiation device 3000 in accordance with embodiments of this disclosure. The layer 3 tunnel instantiation device 3000 can include, but is not limited to, an interface 1 3010, a bridge 3020, an encapsulation/de-encapsulation 3030, and an interface 2 3040. In some implementations, the layer 3 tunnel instantiation device 3000 can include a reporting function 3050. The layer 3 tunnel instantiation device 3000 can be the layer 3 tunnel instantiation device 2800 in FIG. 2. The layer 3 tunnel instantiation device 3000 can receive user device traffic, such as via one or more VLAN channels, from user devices (or transmit de-encapsulated traffic to the user devices) and the layer 3 tunnel instantiation device 3000 can send encapsulated user device traffic to a NG 3100 (or receive traffic from the NG 3100). The layer 3 tunnel instantiation device 3000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

The interface 1 3010 is an access point facing interface which receives layer 2 user device traffic that has been processed via a DPI, for example. The interface 1 3010 provides physical and/or logical connectivity to the bridge 3020.

The bridge 3020 can handle one or more layer 2 user device traffic streams, consolidate for transmission, and forward to the encapsulation/de-encapsulation 3030. In a reverse direction, the bridge 3020 can handle one or more layer 2 user device traffic streams for transmission toward an access point. The bridge 3020 is a bi-directional switch which facilitates communication between the encapsulation/de-encapsulation 3030 and the access point and/or user devices. In some implementations, the bridge 3020 can facilitate tracking of layer 2 MAC addresses by forwarding such information to the reporting function 3050.

The encapsulation/de-encapsulation 3030 can encapsulate each user device traffic stream (layer 2 packets) to generate layer 3 packets. In some implementations, the type of encapsulation can be based on the characteristics or policies of the user device traffic stream. In a reverse direction, the encapsulation/de-encapsulation 3030 cam de-encapsulate layer 3 packets to generate layer 2 packets, which are then forwarded to the bridge 3020. That is, the encapsulation/de-encapsulation 3030 is a bi-directional device. In some implementations, the encapsulation/de-encapsulation 3030 can track the destination addresses and report same to the reporting function 3050.

The interface 2 3040 is a network gateway facing interface which receives layer 3 encapsulated packets for transmission to the network gateway or the encapsulation/de-encapsulation 3030, as appropriate.

The reporting function 3050 can receive addressing information and other information from the bridge 3020 and the encapsulation/de-encapsulation 3030. The collected information can be sent to an operations support system and business support system (OSS/BSS) 3200 for external logging and monitoring. For example, the OSS/BSS 3200 can determine why packets may not be reaching their destinations, level of activity in either direction, level of activity based on time of day, and other metrics and/or issues.

Figure 4:
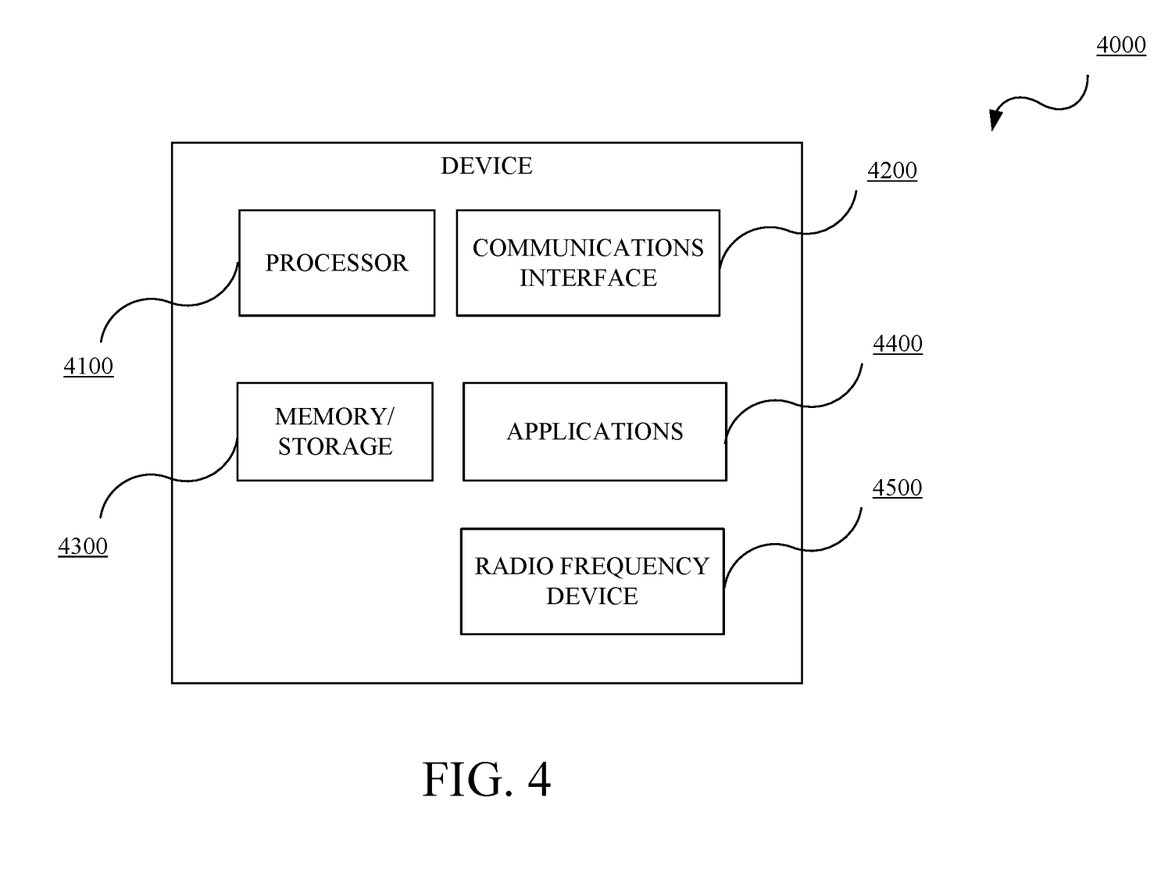
FIG. 4 is a block diagram of an example of a user device in accordance with embodiments of this disclosure.

FIG. 4 is a block diagram of an example of a device 4000 in accordance with embodiments of this disclosure. The device 4000 may include, but is not limited to, a processor 4100, a memory/storage 4200, a communication interface 4300, applications 4400, and a radio frequency device 4500. The device 4000 may include or implement, for example, any of the user devices 1, 2 . . . , N 2200 and 2210, the AP 2100, the NG 2400, and the NG 3100. The applicable or appropriate techniques or methods described herein may be stored in the memory/storage 4200 and executed by the processor 4100 in cooperation with the memory/storage 4200, the communications interface 4300, the applications 4400, and the radio frequency device 4500, as appropriate. The device 4000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 5:
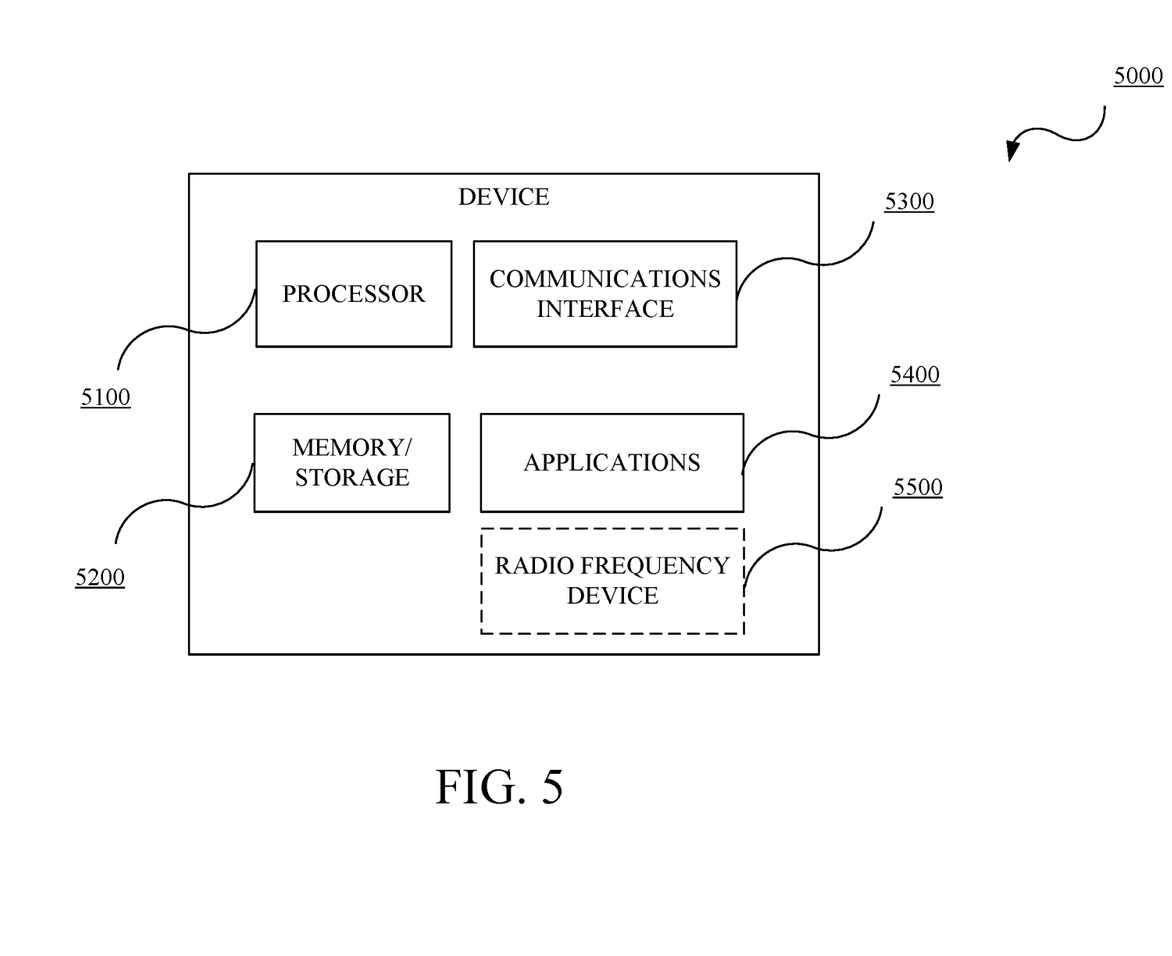
FIG. 5 is a block diagram of an example of a device in accordance with embodiments of this disclosure.

FIG. 5 is a block diagram of an example of a device 5000 in accordance with embodiments of this disclosure. The device 5000 may include, but is not limited to, a processor 5100, a memory/storage 5200, a communication interface 5300, and applications 5400. In an implementation, the device 5000 may include a radio frequency device 5500. The device 5000 may include or implement, for example, the layer 3 tunnel instantiation device 2800, the layer 3 tunnel instantiation device 3000, the NG 2400, and the NG 3100. The applicable or appropriate techniques or methods described herein may be stored in the memory/storage 5200 and executed by the processor 5100 in cooperation with the memory/storage 5200, the communications interface 5300, the applications 5400, and the radio frequency device 5500 (when applicable), as appropriate. The device 5000 may include other elements which may be desirable or necessary to implement the devices, systems, and methods described herein. However, because such elements and steps are well known in the art, and because they do not facilitate a better understanding of the disclosed embodiments, a discussion of such elements and steps may not be provided herein.

Figure 6:
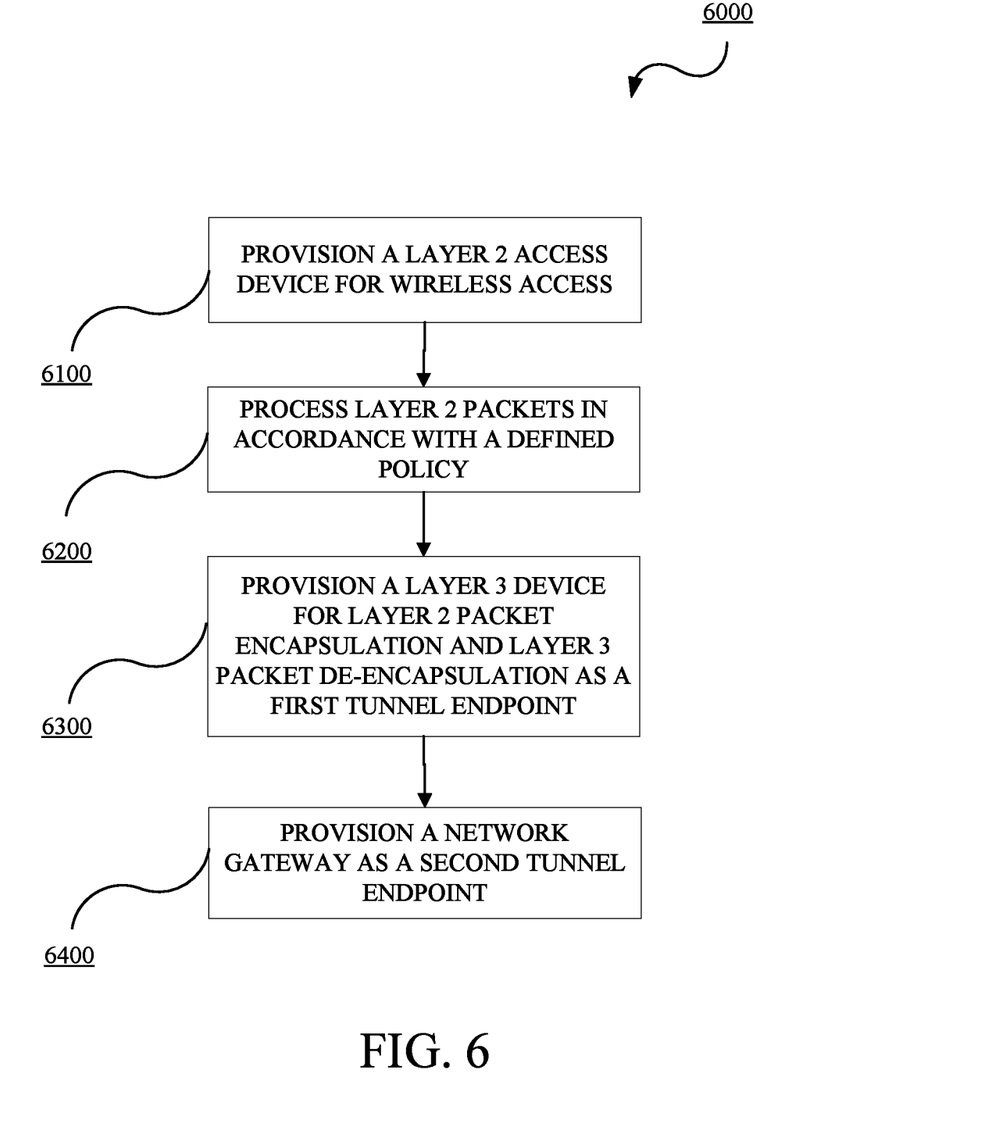
FIG. 6 is a flowchart of an example method for configuring a network for flexible nodal layer 3 overlay of layer 2 traffic in accordance with embodiments of this disclosure.

FIG. 6 is a flowchart of an example method 6000 for configurable encapsulation instantiation in accordance with embodiments of this disclosure. The method 6000 includes: provisioning 6100 a layer 2 access device for wireless access; processing 6200 layer 2 packets in accordance with a defined policy; provisioning 6300 a layer 3 device for layer 2 packet encapsulation and layer 3 packet de-encapsulation as a first tunnel endpoint; and provisioning 6400 a network gateway as a second tunnel endpoint. For example, the technique 6000 may be implemented, as applicable and appropriate, by the network architecture 2000 and elements therein, the layer 3 tunnel instantiation device 3000, the device 4000, and the device 5000.

The method 6000 includes provisioning 6100 a layer 2 access device for wireless access. A network implemented at a site can provide wireless access, such as Wi-Fi access, to user devices via the layer 2 access device. The layer 2 device can receive layer 2 packets from the user devices. In some implementations, the layer 2 packets are received via one or more VLAN channels with associated VLAN tags. The layer 2 device can also send layer 2 packets to the user devices. The layer 2 access device provides MAC addressing processing.

The method 6000 includes processing 6200 layer 2 packets in accordance with a defined policy. The layer 2 access device forwards the layer 2 packets for processing by site specific inspection devices, which operate at layer 2. The site specific inspection devices confirms that the layer 2 packets are in conformance with the policies and rules of the site. The layer 2 packets can be forwarded to private or commercial networks depending on packet characteristics. For example, VLAN tags can be used to direct the packets accordingly. The site specific inspection devices also inspect packets headed toward user devices accessing the network.

The method 6000 includes provisioning 6300 a layer 3 device for layer 2 packet encapsulation and layer 3 packet de-encapsulation as a first tunnel endpoint. The site specific inspection devices can forward the layer 2 packets to the layer 3 device to access or use the commercial network or to access the Internet, for example. The layer 3 device applies encapsulation to the layer 2 packets to generate layer 3 packets. The layer 3 device applies de-encapsulation to layer 3 packets to generate layer 2 packets headed toward the user devices. The layer 3 device is an instantiation endpoint for one end of a layer 3 tunnel which is used to send encapsulated layer 2 packets or receive layer 3 packets from the network gateway. The layer 3 device, being separate from the layer 2 access device, enables flexible and/or configurable placement of the layer 3 tunnel endpoint at any point in a layer 2 domain of the network. For example, placement of the layer 3 device at an edge of the network enables operation of the site specific inspection devices. The layer 3 device establishes a demarcation point between the layer 2 domain and the layer 3 domain.

The method 6000 includes provisioning 6400 a network gateway as a second tunnel endpoint. The other end of the layer 3 tunnel is instantiated at the network gateway. The network gateway provides IP addressing processing, routing, and policy processing. In some implementations, the policy processing is based on the encapsulated layer 2 packet characteristics. In some implementations, the policy processing is based on the VLAN tag of the encapsulated layer 2 packet. The network gateway performs similar functionality to layer 3 packets received from the Internet and directed to user devices accessing the network.

In an implementation, a network deployed at a site includes an access device configured to receive layer 2 traffic from user devices, the access device operating in a layer 2 domain, a packet inspection device configured to inspect the layer 2 traffic forwarded by the access device, the packet inspection device operating in the layer 2 domain, and a layer 3 tunnel instantiation device configured to encapsulate the layer 2 traffic forwarded by the packet inspection device into layer 3 traffic, the layer 3 tunnel instantiation device establishing a demarcation between the layer 2 domain and a layer 3 domain. The layer 3 tunnel instantiation device is configured to provide a first tunnel endpoint for a layer 3 tunnel, the first tunnel endpoint connected to a second tunnel endpoint instantiated at a network gateway, and the layer 3 traffic is transmitted over the layer 3 tunnel. In some implementations, the layer 3 tunnel instantiation device configured to de-encapsulate layer 3 traffic forwarded by the network gateway over the layer 3 tunnel, and the packet inspection device configured to inspect the de-encapsulated layer 3 traffic forwarded by the layer 3 tunnel instantiation device. In some implementations, the packet inspection device is inoperable in the layer 3 domain. In some implementations, the access device and the layer 3 tunnel instantiation device are separate components. In some implementations, the access device and the layer 3 tunnel instantiation device physically separate. In some implementations, the access device and the layer 3 tunnel instantiation device logically separate. In some implementations, the layer 3 tunnel instantiation device configured to collect and report address information with respect to the layer 2 traffic forwarded by the packet inspection device and the de-encapsulated layer 3 traffic to a monitoring system. In some implementations, the layer 3 tunnel instantiation device configured to encapsulate the layer 2 traffic forwarded by the packet inspection device in accordance with characteristics of the layer 2 traffic forwarded by the packet inspection device. In some implementations, the layer 3 tunnel instantiation device further including a bridge configured to consolidate multiple layer 2 traffic for transmission to an encapsulation device, and the encapsulation device configured to apply encapsulation based on a layer 2 traffic type. In some implementations, the network further including a monitor configured to collect, from the bridge, address information with respect to each layer 2 traffic, the monitor configured to collect, from the encapsulation device, address information with respect to each layer 3 traffic, and the monitor configured to send a report to a monitoring system.

In an implementation, a configurable endpoint constructor includes a bridge configured to receive and consolidate multiple layer 2 packet streams from a site specific inspection device configured to inspect each layer 2 packet stream in a layer 2 space and an encapsulation and de-encapsulation device configured to encapsulate each layer 2 packet stream for transmission over a layer 3 tunnel. The bridge and the encapsulation and de-encapsulation device are collectively a tunnel endpoint for the layer 3 tunnel and a remaining tunnel endpoint is instantiated at a network gateway. The configurable endpoint constructor is configured to provide a moveable layer 2-layer 3 demarcation line with respect to the site specific inspection device. In some implementations, the encapsulation and de-encapsulation device configured to de-encapsulate layer 3 traffic forwarded by the network gateway over the layer 3 tunnel. In some implementations, a monitor configured to collect, from the bridge, address information with respect to each layer 2 packet stream, the monitor configured to collect, from the encapsulation device, address information with respect to each de-encapsulated layer 3 traffic, and the monitor configured to send a report to a monitoring system. In some implementations, the encapsulation and de-encapsulation device configured to encapsulate in accordance with characteristics of a layer 2 packet stream.

In an implementation, a method for flexible nodal layer 3 overlay of layer 2 traffic includes provisioning a layer 2 access device for wireless access to a site network by user devices, where a layer 2 inspection device is configured to process, in accordance with a policy imposed by the site network, layer 2 packets received from the layer 2 access device, provisioning a layer 3 device for layer 2 packet encapsulation of the layer 2 packets and transmission of encapsulated layer 2 packets over a layer 3 tunnel, wherein the layer 3 device instantiates a first layer 3 tunnel endpoint as a flexible layer 2-layer 3 demarcation line with respect to the layer 2 inspection device, and provisioning a second layer 3 tunnel endpoint at a network gateway. In some implementations, the layer 2 inspection device is inoperable in the layer 3 domain. In some implementations, the layer 2 access device and the layer 3 device are separate components. In some implementations, the layer 2 access device and the layer 3 device are physically and logically separated. In some implementations, the layer 3 device is configured to encapsulate each layer 2 packet according to characteristics of the layer 2 packet. In some implementations, the layer 3 device is configured to report to a monitoring system address information with respect to each layer 2 packet.

In an implementation, a network deployed at a site includes a layer 3 tunnel instantiation device. The device is configured to encapsulate layer 2 traffic into layer 3 traffic, wherein the layer 2 traffic is inspected by a packet inspection device and forwarded via the packet inspection device and an access device from user devices, and provide a first tunnel endpoint for a layer 3 tunnel to establish a demarcation point between a layer 2 domain and a layer 3 domain, the first tunnel endpoint connected to a second tunnel endpoint instantiated at a network gateway. The layer 3 traffic is transmitted over the layer 3 tunnel, and the packet inspection device and the access device are configured to operate in the layer 2 domain. In some implementations, the layer 3 tunnel instantiation device is configured to de-encapsulate layer 3 traffic forwarded by the network gateway over the layer 3 tunnel. The packet inspection device is configured to inspect the de-encapsulated layer 3 traffic forwarded by the layer 3 tunnel instantiation device. In some implementations, the packet inspection device is inoperable in the layer 3 domain. In some implementations, the access device and the layer 3 tunnel instantiation device are separate components. In some implementations, the access device and the layer 3 tunnel instantiation device are physically separate. In some implementations, the access device and the layer 3 tunnel instantiation device are logically separate. In some implementations, the layer 3 tunnel instantiation device configured to collect and report address information, with respect to the layer 2 traffic forwarded by the packet inspection device and the de-encapsulated layer 3 traffic, to a monitoring system. In some implementations, the layer 3 tunnel instantiation device configured to encapsulate the layer 2 traffic forwarded by the packet inspection device in accordance with characteristics of the layer 2 traffic forwarded by the packet inspection device. In some implementations, the layer 3 tunnel instantiation device further includes a bridge configured to consolidate multiple layer 2 traffic for transmission to an encapsulation device, and the encapsulation device configured to apply encapsulation based on a layer 2 traffic type. In some implementations, the layer 3 tunnel instantiation device further includes a monitor configured to collect, from the bridge, address information with respect to each layer 2 traffic. The monitor configured to collect, from the encapsulation device, address information with respect to each layer 3 traffic, and the monitor configured to send a report to a monitoring system.

In an implementation, a method for flexible nodal layer 3 overlay of layer 2 traffic includes provisioning a layer 3 device for packet encapsulation of layer 2 packets and transmission of encapsulated layer 2 packets over a layer 3 tunnel, where the layer 3 device instantiates a first layer 3 tunnel endpoint as a flexible layer 2-layer 3 demarcation line with respect to a layer 2 inspection device, and provisioning a second layer 3 tunnel endpoint at a network gateway. The layer 3 device is configured to receive layer 2 packets from user devices via a layer 2 access device configured to provide wireless access to a site network and the layer 2 inspection device, the layer 2 inspection device configured to process, in accordance with a policy imposed by the site network, layer 2 packets received from the layer 2 access device. In some implementations, the layer 2 inspection device is inoperable in the layer 3 domain. In some implementations, the layer 2 access device and the layer 3 device are separate components. In some implementations, the layer 2 access device and the layer 3 device are physically and logically separated. In some implementations, the layer 3 device is configured to encapsulate each layer 2 packet according to characteristics of the layer 2 packet. In some implementations, the layer 3 device is configured to report to a monitoring system address information with respect to each layer 2 packet.

Although some embodiments herein refer to methods, it will be appreciated by one skilled in the art that they may also be embodied as a system or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects of the present invention may take the form of a computer program product embodied in one or more the computer readable mediums having the computer readable program code embodied thereon. For example, the computer readable mediums can be non-transitory. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A network deployed at a site, comprising:
an access device configured to operate in a layer 2 domain and receive layer 2 traffic from user devices;
a packet inspection device configured to operate in a layer 2 domain and receive layer 2 traffic from the access device; and
a layer 3 tunnel instantiation device configured to:
encapsulate layer 2 traffic into layer 3 traffic, wherein the layer 2 traffic is inspected and forwarded by the packet inspection device to the layer 3 tunnel instantiation device; and
provide a first tunnel endpoint for a layer 3 tunnel to establish a demarcation point between a layer 2 domain and a layer 3 domain, the first tunnel endpoint connected to a second tunnel endpoint instantiated at a network gateway,
wherein the layer 3 traffic is transmitted over the layer 3 tunnel.

2. The network of claim 1, further comprising:
the layer 3 tunnel instantiation device configured to de-encapsulate layer 3 traffic forwarded by the network gateway over the layer 3 tunnel, wherein the packet inspection device is configured to inspect the de-encapsulated layer 3 traffic forwarded by the layer 3 tunnel instantiation device.

3. The network of claim 1, wherein the packet inspection device is inoperable in the layer 3 domain.

4. The network of claim 1, wherein the access device and the layer 3 tunnel instantiation device are separate components.

5. The network of claim 1, wherein the access device and the layer 3 tunnel instantiation device are physically separate.

6. The network of claim 5, wherein the access device and the layer 3 tunnel instantiation device are logically separate.

7. The network of claim 1, further comprising:
the layer 3 tunnel instantiation device configured to collect and report address information, with respect to the layer 2 traffic forwarded by the packet inspection device and the de-encapsulated layer 3 traffic, to a monitoring system.

8. The network of claim 1, further comprising:
the layer 3 tunnel instantiation device configured to encapsulate the layer 2 traffic forwarded by the packet inspection device in accordance with characteristics of the layer 2 traffic forwarded by the packet inspection device.

9. The network of claim 1, the layer 3 tunnel instantiation device further comprising:
a bridge configured to consolidate multiple layer 2 traffic streams for transmission to an encapsulation device; and
the encapsulation device configured to apply encapsulation based on a layer 2 traffic type.

10. The network of claim 9, the layer 3 tunnel instantiation device further comprising:
a monitor configured to collect, from the bridge, address information with respect to each layer 2 traffic stream;
the monitor configured to collect, from the encapsulation device, address information with respect to each layer 3 traffic stream; and
the monitor configured to send a report to a monitoring system.

11. A method for flexible nodal layer 3 overlay of layer 2 traffic, the method comprising:
provisioning a layer 3 device for packet encapsulation of layer 2 packets into layer 3 packets and transmission of the layer 3 packets over a layer 3 tunnel, wherein the layer 3 device instantiates a first layer 3 tunnel endpoint as a flexible layer 2-layer 3 demarcation line with respect to a layer 2 inspection device; and
provisioning a second layer 3 tunnel endpoint at a network gateway,
wherein the layer 3 device is configured to receive the layer 2 packets from user devices via a layer 2 access device configured to provide wireless access to a site network and via the layer 2 inspection device, the layer 2 inspection device configured to process, in accordance with a policy imposed by the site network, the layer 2 packets received from the layer 2 access device.

12. The method of claim 11, wherein the layer 2 inspection device is inoperable in the layer 3 domain.

13. The method of claim 11, wherein the layer 2 access device and the layer 3 device are separate components.

14. The method of claim 11, wherein the layer 2 access device and the layer 3 device are physically and logically separated.

15. The method of claim 11, wherein the layer 3 device is configured to encapsulate each layer 2 packet according to characteristics of the layer 2 packet.

16. The method of claim 11, wherein the layer 3 device is configured to report to a monitoring system address information with respect to each layer 2 packet.

\* \* \* \* \*